F. A. GREARSON.
TOASTER.
APPLICATION FILED NOV. 6, 1912.
1,075,144.
Patented Oct. 7, 1913.
2 SHEETS—SHEET 1.
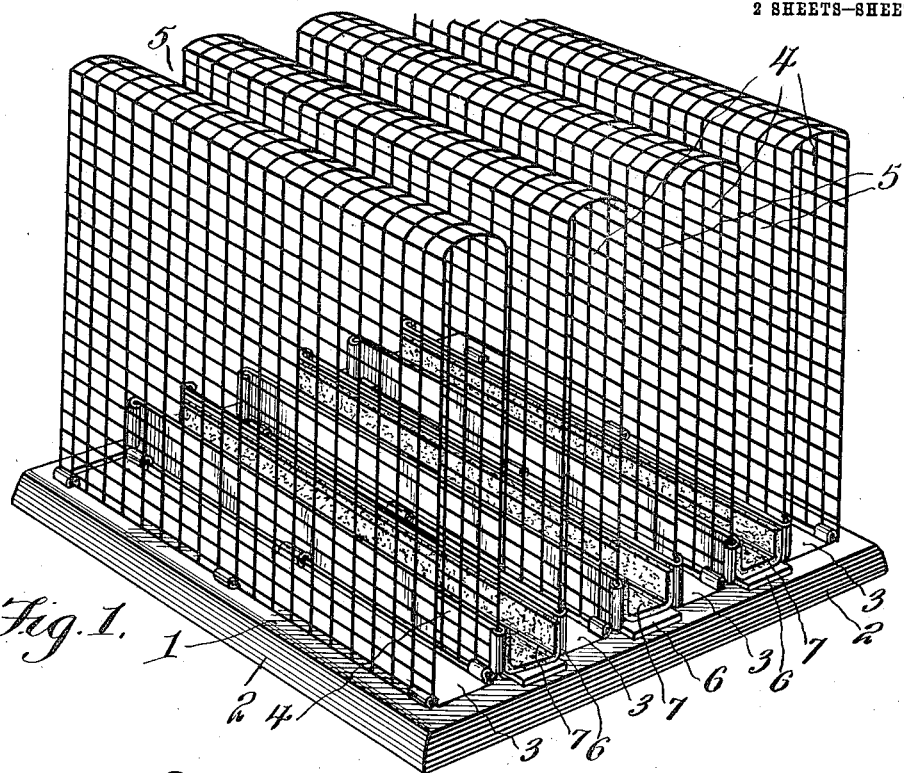
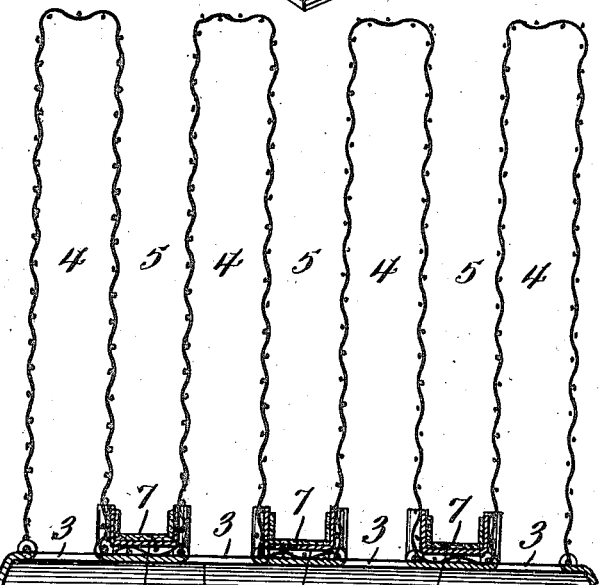
Witnesses
G. J. L. Wright
W. J. Koerth
Inventor
F. A. Grearson
By Victor J. Evans
Attorney

F. A. GREARSON.
TOASTER.
APPLICATION FILED NOV. 6, 1912.

1,075,144.

Patented Oct. 7, 1913
2 SHEETS—SHEET 2.

Inventor
F. A. Grearson
By Victor J. Evans
Attorney

Witnesses

UNITED STATES PATENT OFFICE.

FREDERICK A. GREARSON, OF BARRE, VERMONT.

TOASTER.

1,075,144.

Specification of Letters Patent.

Patented Oct. 7, 1913.

Application filed November 6, 1912. Serial No. 729,882.

*To all whom it may concern:*

Be it known that I, FREDERICK A. GREARSON, a citizen of the United States, residing at Barre, in the county of Washington and State of Vermont, have invented new and useful Improvements in Toasters, of which the following is a specification.

The present invention relates to improvements in bread toasters.

One of the objects of the invention is to provide a toaster embodying a plurality of spaced reticulated walls, the space between two of the walls forming a receptacle for the bread to be toasted, and the space between the two adjacent walls providing compartments which receive the heat from a stove or the like, and which direct the heat to the opposite sides of the bread.

A further object of the invention is to provide a toaster with bread receiving compartments, and heat or flame directing compartments or passages which are arranged adjacent the bread receiving compartments, all of the compartments being made up from a single piece of foraminous material, the compartments being arranged upon a suitable base, the lower walls of the bread compartments being connected with the base, and the upper or connecting walls of the heat compartments are disposed above the base, the walls connected with the base having a plate or coating of fire proof material which obviates the danger of the burning of the bread which is positioned upon the toaster.

A still further object of the invention is the construction and arrangement of parts in a device of this character whereby the slices of bread to be toasted can be readily arranged upon the toaster and removed therefrom without danger of the hand of the operator being contacted by the flame, and further wherein both the sides of the bread will be simultaneously toasted.

With the above recited objects in view, and others which will appear as the nature of the invention is more fully understood the improvement resides in the construction, combination and arrangement of parts set forth in the following description, and falling within the scope of the appended claims.

Figure 3:
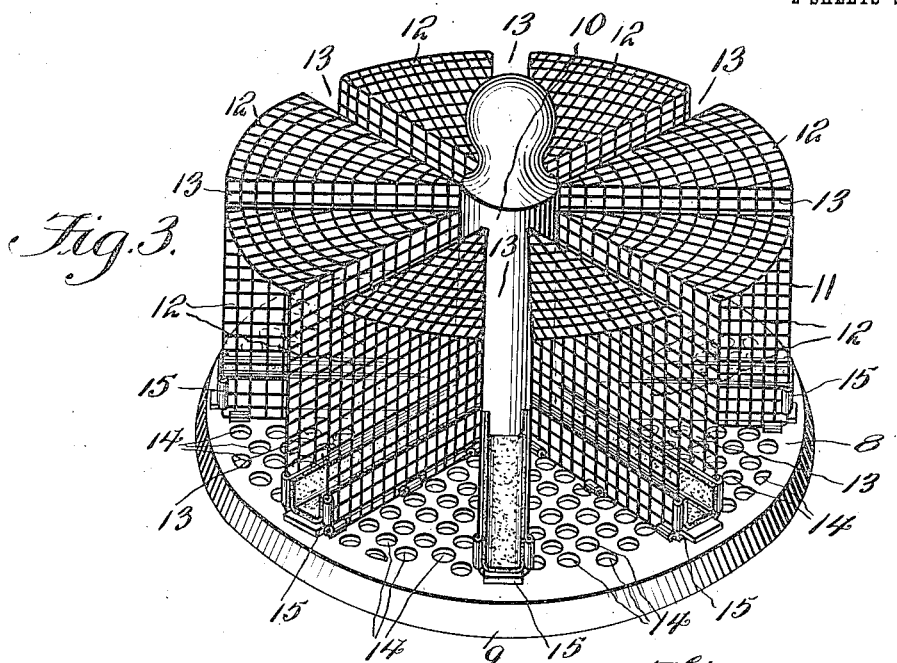
Figure 4:
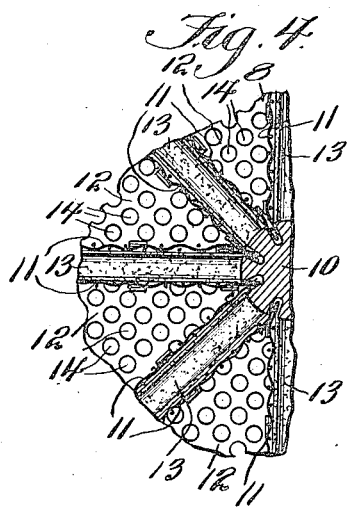

In the drawing, Figure 1 is a view of a toaster constructed in accordance with the present invention. Fig. 2 is a central vertical longitudinal sectional view through the same. Fig. 3 is a view of a slightly modified form of the toaster. Fig. 4 is a horizontal sectional view of the same, Fig. 5 is a bottom plan view of the same.

The toaster, in the showing illustrated in Figs. 1 and 2 of the drawings, includes a substantially rectangular base 1, which is provided with a continuous down-turned flange 2. The base is provided with a plurality of spaced substantially rectangular openings 3 which terminate a suitable distance away from the side flanges. The toaster proper is preferably constructed from a single sheet of wire mesh, and has its free ends connected with the longitudinal edges of the base. The toaster is extended upwardly from its said connections and is bent or extended horizontally directly over the slots or openings 3, and is thence continued downwardly and connected to as well as extended over the strips provided between the openings 3. By this arrangement it will be noted that a plurality of substantially rectangular compartments are provided, the heat or flame directing compartments, which are arranged adjacent the sides provided by the openings 3 being designated by the numerals 4, while the bread receiving compartments 5 are disposed above the connecting strips arranged adjacent the slots or openings 3. These compartments are of a width equaling the width of the said strips, and having open tops permit of the ready insertion of the slices of bread to within the compartments. By such an arrangement it will be noted that when the device is arranged over a suitable flame, each slice of bread is toasted simultaneously upon its opposite faces. The toaster may be provided with any number of compartments desired, and the bread compartments 5 are provided each, above the connecting strip of the base with a metallic substantially U-shaped plate 6. These plates have the outer edges of their flanged portions bent to engage with the edges of the wire mesh, and the said plates are also adapted to receive a strip of fire proof material which is designated by the numeral 7.

Figure 5:
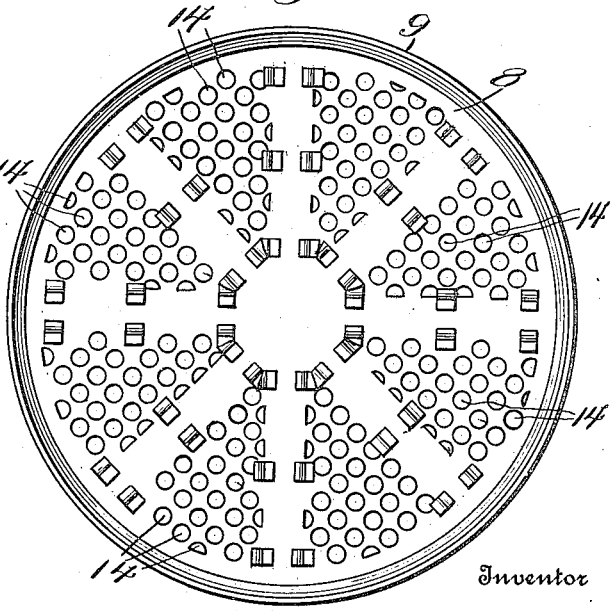

In Figs. 3, 4 and 5 of the drawings, the device illustrated embodies a circular base 8, which is provided with a continuous peripheral flange 9, the base is centrally formed with an upstanding member or post 10, and connected with the said post is a wire mesh

11 which radiates therefrom to provide heat directing compartments or flues 12, and bread or toast receiving compartments 13. The compartments are formed in substantially the same manner as that described in connection with Figs. 1 and 2, and the base 8 is provided with openings 14 through which the flame passes to the heat directing compartments or flues. The portion of the mesh forming the bottom of the toast receiving compartments rests upon the impervious portions of the base, but is also preferably provided with a flanged metallic member 15 which is removably connected thereto, and the said flanged member is adapted to receive a strip or coating of fire proof material such as asbestos.

From the above description, taken in connection with the accompanying drawing, the simplicity of the device, as well as the advantages thereof, will, it is thought, be perfectly apparent to those skilled in the art to which such inventions appertain without further detailed description.

Having thus described the invention, what I claim is:—

1. A bread toaster comprising a base, flame directing and toast receiving compartments arranged upon the base, said compartments being formed from a single piece of reticulated material, U-shaped plates for the toast compartments, and each of the said plates being provided with a coating of fire proof material.

2. In a bread toaster, a flanged base provided with openings, a reticulated member secured to the base, the said member being bent to provide continuous sides provided with alternating tops and bottoms, the bottoms being arranged upon the base and adjacent the openings thereof, substantially U-shaped plates arranged upon the bottoms, means provided by the plates for retaining the plates upon the bottoms, and each of the plates having a coating of fire proof material.

3. In a bread toaster, a base having a continuous peripheral flange, said base having a central post, said base being further provided with openings, a mesh, said mesh being also connected with the base, and being bent to provide continuous side walls having consecutive tops and bottoms, the tops being arranged above the openings in the base, and the bottoms being arranged upon the non-perforated portion of the base, and flanged plates for the bottoms.

In testimony whereof I affix my signature in presence of two witnesses.

FREDERICK A. GREARSON.

Witnesses:
  JAMES GREARSON,
  EARLE R. DAVIS.